US006679348B2

United States Patent
Handa et al.

(10) Patent No.: US 6,679,348 B2
(45) Date of Patent: Jan. 20, 2004

(54) VEHICULAR TWO-WHEEL/FOUR-WHEEL DRIVE SWITCHING DEVICE

(75) Inventors: Akio Handa, Saitama (JP); Noriaki Takano, Saitama (JP); Bunzo Seki, Saitama (JP)

(73) Assignees: Honda Giken Kogyo Kabushiki Kaisha, Tokyo (JP); NTN Corporation, Osaka (JP)

( * ) Notice: Subject to any disclaimer, the term of this patent is extended or adjusted under 35 U.S.C. 154(b) by 54 days.

(21) Appl. No.: 10/061,340

(22) Filed: Feb. 4, 2002

(65) Prior Publication Data

US 2002/0100629 A1 Aug. 1, 2002

(30) Foreign Application Priority Data

Feb. 1, 2001 (JP) ......................................... 2001-025668

(51) Int. Cl.[7] ............................................. B60K 17/354
(52) U.S. Cl. ....................................... 180/247; 100/249
(58) Field of Search ................................ 180/247, 248, 180/249, 250

(56) References Cited

U.S. PATENT DOCUMENTS

| 3,300,002 | A | * | 1/1967 | Roper | 180/249 |
| 3,476,226 | A | * | 11/1969 | Massey | 192/27 |
| 3,584,713 | A | * | 6/1971 | Tani | 180/249 |
| 4,643,284 | A | * | 2/1987 | Hardt et al. | 192/50 |
| 4,805,718 | A | * | 2/1989 | Iwata et al. | 180/247 |
| 5,036,939 | A | * | 8/1991 | Johnson et al. | 180/247 |
| 5,195,604 | A | * | 3/1993 | Brockett et al. | 180/248 |
| 5,924,510 | A | * | 7/1999 | Itoh et al. | 180/197 |
| 6,530,447 | B2 | * | 3/2003 | Seki et al. | 180/233 |
| 6,547,025 | B1 | * | 4/2003 | Gassmann et al. | 180/245 |
| 2002/0046893 | A1 | * | 4/2003 | Handa | 180/247 |

FOREIGN PATENT DOCUMENTS

| JP | 10-297313 | 11/1998 |
| JP | 11-001131 | 1/1999 |

* cited by examiner

Primary Examiner—Daniel G. DePumpo
(74) Attorney, Agent, or Firm—Sughrue Mion, PLLC

(57) ABSTRACT

A vehicular two-wheel/four-wheel drive switching device for selectively transmitting power or disconnecting the transmission of rotary power to a power transmission system having a driving shaft connected to the drive side and a driven shaft fitted to the driving shaft via respective inner and outer rings having an annular clearance therebetween. Plural connecting/disconnecting members provided in the clearance between the inner and outer rings for connecting or disconnecting the driving shaft and the driven shaft are fitted or disconnected to/from respective opposite surfaces in response to a switching mechanism for selectively positioning the connecting/disconnecting members in a position in which the driving shaft and the driven shaft are connected and in a position in which they are disconnected. A casing encloses the switching device, and an oil seal is provided in two locations at an interval in the longitudinal direction of the driven shaft.

8 Claims, 6 Drawing Sheets

(a)

Electromagnetic clutch OFF (b)

Electromagnetic clutch ON

VEHICULAR TWO-WHEEL/FOUR-WHEEL DRIVE SWITCHING DEVICE

FIELD OF THE INVENTION

The present invention relates to a vehicular two-wheel/four-wheel drive switching device for switching between two-wheel and four-wheel drive modes of operation.

BACKGROUND OF THE INVENTION

Heretofore, vehicles capable of switching between two-wheel and four-wheel drive modes of operation have been known. FIGS. 4 and 5 show an example of such a vehicle. The vehicle 1 has a body frame 3 in the center of which an engine 2 is mounted. A pair of front wheels 4 and a pair of rear wheel 5 are arranged at the front and rear portions of the body frame 3, and a steering handlebar 6 is arranged above the front portion of the body frame 3 for steering the vehicle via the front wheels 4. A fuel tank 7 is located above the engine 2 and attached to the body frame 3, and a seat 8 is attached to the rear of the fuel tank 7.

As shown in FIG. 5, the front wheels 4 are supported by a suspension system 9 so that each front wheel can move vertically, and the rear wheels 5 are supported by a suspension system 10 so that each rear wheel also can move vertically.

A final reduction gear mechanism (differential) 13 for driving the front wheels 4 and a final reduction gear mechanism 14 for driving the rear wheels and connected to the engine 2 via respective drive shafts 11 and 12 are provided in the center of the front portion and the center of the rear portion, respectively, of the body frame 3. The right and left front wheels 4 and the right and left rear wheels 5 are respectively connected to the final reduction gear mechanism 13 for the front wheels and the final reduction gear mechanism 14 for the rear wheels.

A two-wheel/four-wheel drive switching device for switching between rear-wheel drive and four-wheel drive by selectively transmitting and disconnecting motive power to the front wheels 4 is provided, for example, between the final reduction gear mechanism 13 for the front wheels and the drive shaft 11. Alternatively, the two-wheel/four-wheel drive switching device can be provided between the rear drive shaft 12 and the final reduction gear mechanism 14 for the rear wheels.

The switching of the mode of drive is performed by the driver of the vehicle according to factors such as the state of the road surface and the type driving.

A two-wheel/four-wheel drive switching device having the structure shown in FIG. 6 has previously been proposed.

The two-wheel/four-wheel drive switching device denoted by reference number 15 in FIG. 6 is composed of two input shaft components 16a and 16b formed by axially dividing the input shaft 16 of the final reduction gear mechanism 13 for the front wheels into two shafts which are aligned on the same axis, and a switching device 17 for selectively connecting and disconnecting the shaft components 16a and 16b.

In more detail, a cylindrical positioning protrusion 18 is provided in the center of the end face of the input shaft component 16a located on the side of the final reduction gear mechanism 13 for the front wheels, and a positioning concave portion 19 into which the positioning protrusion 18 is fitted in such a manner that the positioning protrusion can be turned is formed in the center of the end face of the input shaft component 16b. The two input shaft components 16a and 16b can be connected so that they turn together by positioning the input shaft components 16a and 16b so that the positioning protrusion 18 and the positioning concave portion 19 are interfitted.

Splines S1 and S2 are formed on the respective outer peripheral faces of the engagement parts of both of the input shaft components 16a and 16b. The switching device 17 is arranged such that it surrounds these engagement parts.

The switching device 17 includes a switching ring 20 provided on the inner surface thereof with splines fitted to the respective engagement parts of both input shaft components 16a and 16b so that the switching ring can be slid. With this structure, the splines of the switching ring can be engaged with or disengaged from the respective splines S1 and S2 of the input shaft components 16a and 16b. The switching device 17 further includes a drive mechanism 21 composed of a solenoid for selectively moving the switching ring 20 in the axial direction of the input shaft components 16a and 16b to a position in which its splines are engaged with only one input shaft component 16a or a position in which the splines are simultaneously engaged with the splines S1 and S2 of both input shaft components 16a and 16b.

The two-wheel/four-wheel drive switching device 15 configured as described above can thus select between a two-wheel drive mode in which only the rear wheels are driven by moving the switching ring 20 in one direction by the drive mechanism 21 so as to engage it with only the input shaft component 16a to thereby disconnect the transmission of driving force to the front wheels 4, and a four-wheel drive mode in which driving force is transmitted to both the front wheels 4 and the rear wheels 5 simultaneously by sliding the switching ring 20 so as to connect both input shaft components 16a and 16b.

However, such a conventional type two-wheel/four-wheel drive switching device 15 has the following problems.

When there is difference in rotational speed between the front wheels 4 and the rear wheels 5, in switching drive modes engagement between the switching ring 20 and the input shaft component 16b sometimes may not be possible, thus preventing switching between modes. Even if switching can be made, there is also a problem that the splines may collide in switching, creating a clashing noise.

To solve such a problem, a mechanism for synchronizing (aligning) the splines of the switching ring 20 and the splines of the input shaft component 16b may be provided, but the structure of the switching system then becomes complex, necessitating significant changes in the layout of the existing structure.

Moreover, as the interior chamber of the two-wheel/four-wheel drive switching device 15 and that of the final reduction gear mechanism 13 for the front wheels communicate, the same lubricating oil is required to be used to lubricate the two-wheel/four-wheel drive switching device 15 and the final reduction gear mechanism 13 for the front wheels. However, as the functions of the two-wheel/four-wheel drive switching device 15 and the final reduction gear mechanism 13 for the front wheels are different, it is preferred that different types of lubricants be used.

SUMMARY OF THE INVENTION

The invention has been made to solve the problems occurring in the conventional two-wheel/four-wheel drive switching device, and an object of the invention is to provide a vehicular two-wheel/four-wheel drive switching device the configuration of which is simple, which can be employed without changing the existing configuration of the vehicle, which generates scarcely any noise, and which can be lubricated separately from other actuating parts.

A vehicular two-wheel/four-wheel drive switching device according to the invention includes a driving shaft extending to a drive side of the switching device, a driven shaft extending from a driven side of the switching device, an inner ring and an outer ring having a generally annular clearance formed therebetween, one of the inner ring and the outer ring being coupled to the driving shaft and the other of the inner ring and the outer ring being coupled to the driven shaft, a plurality of connecting/disconnecting members provided in the clearance between the inner ring and the outer ring for selectively connecting and disconnecting the inner ring and the outer ring, a switching mechanism for selectively positioning the connecting/disconnecting members in one of a position in which the inner ring and the outer ring are connected and in a position in which the inner ring and the outer ring are disconnected, a casing receiving the inner ring, the outer ring, the connecting/disconnecting members, and the switching mechanism, and first and second oil seals provided in respective locations at a predetermined interval in a longitudinal direction of the driven shaft for sealing the casing.

The vehicular two-wheel/four-wheel drive switching device according to the invention may further comprise a dust seal for sealing an end of the casing, the dust seal being provided in a clearance formed between the casing and one of the driving shaft and the driven shaft.

The inner ring has a plurality of cam surfaces formed thereon, and the outer ring has a cylindrical inner surface facing the cam surfaces.

The connecting/disconnecting members each comprise a roller, the rollers extending in the clearance between the inner ring and the outer ring in an axial direction of the driving and driven shafts.

The switching mechanism comprises a retainer for rotatably holding the rollers, and an electromagnetic clutch coupled to the retainer.

In the vehicular two-wheel/four-wheel drive switching device according the invention, in the position in which the inner ring and the outer ring are disconnected, the electromagnetic clutch is disengaged and the rollers abut lower portions of corresponding ones of the cam surfaces, while in the position in which the inner ring and the outer ring are connected, the electromagnetic clutch is engaged, the retainer moves together with the outer ring, and the rollers are moved towards higher positions of the cam surfaces so as to abut the higher portions of corresponding ones of the cam surfaces and the inner surface of the outer ring.

The outer ring may comprise first and second portions coupled to one another via a spline connection.

A bevel gear may be integrally formed with an end of the driven shaft, the bevel gear being engaged with a ring gear of a final reduction gear for the front wheels.

DESCRIPTION OF THE PREFERRED EMBODIMENTS

Figure 1:
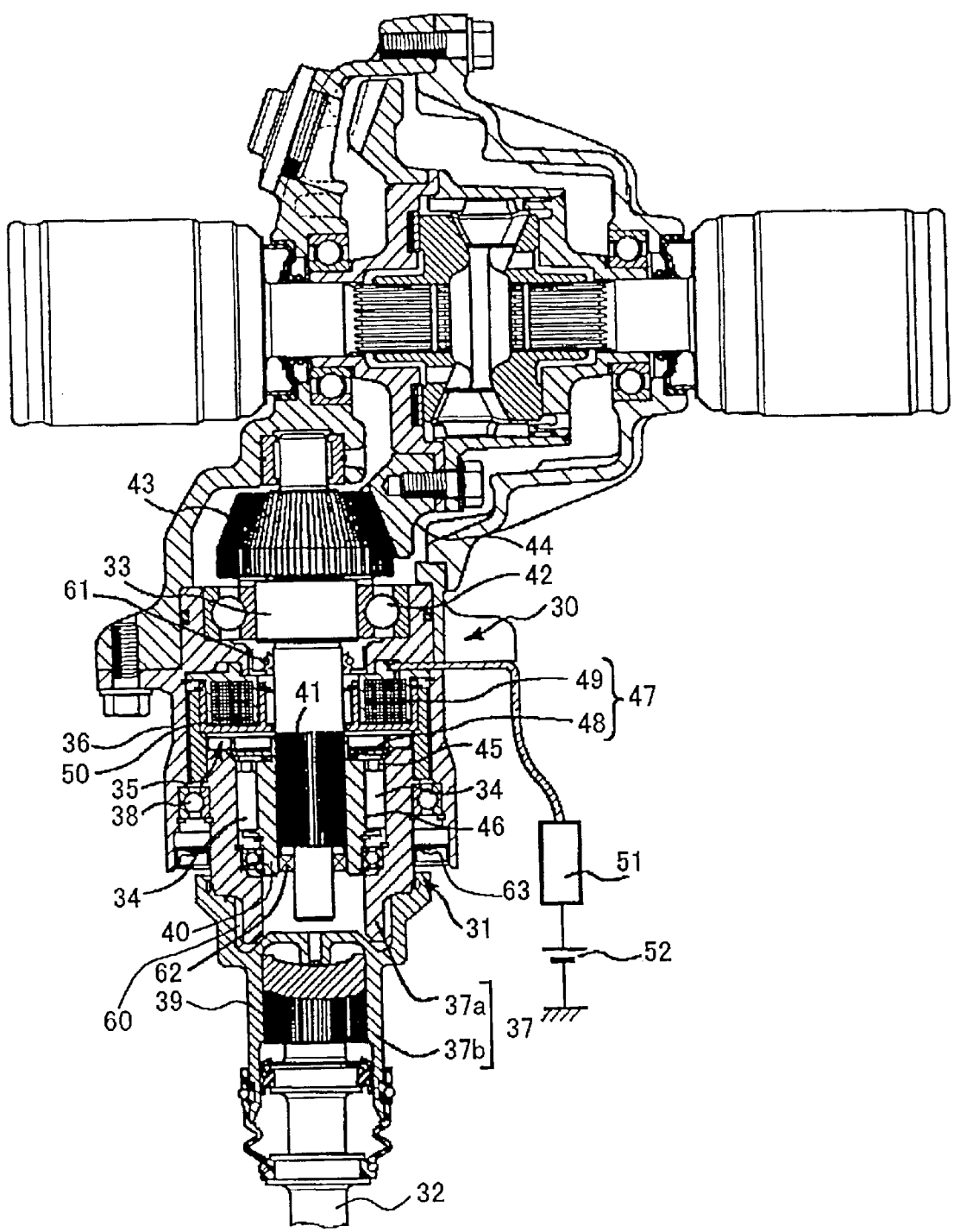
FIG. 1 is a sectional view showing one embodiment of a two-wheel/four-wheel drive switching device of the invention.
Figure 2:
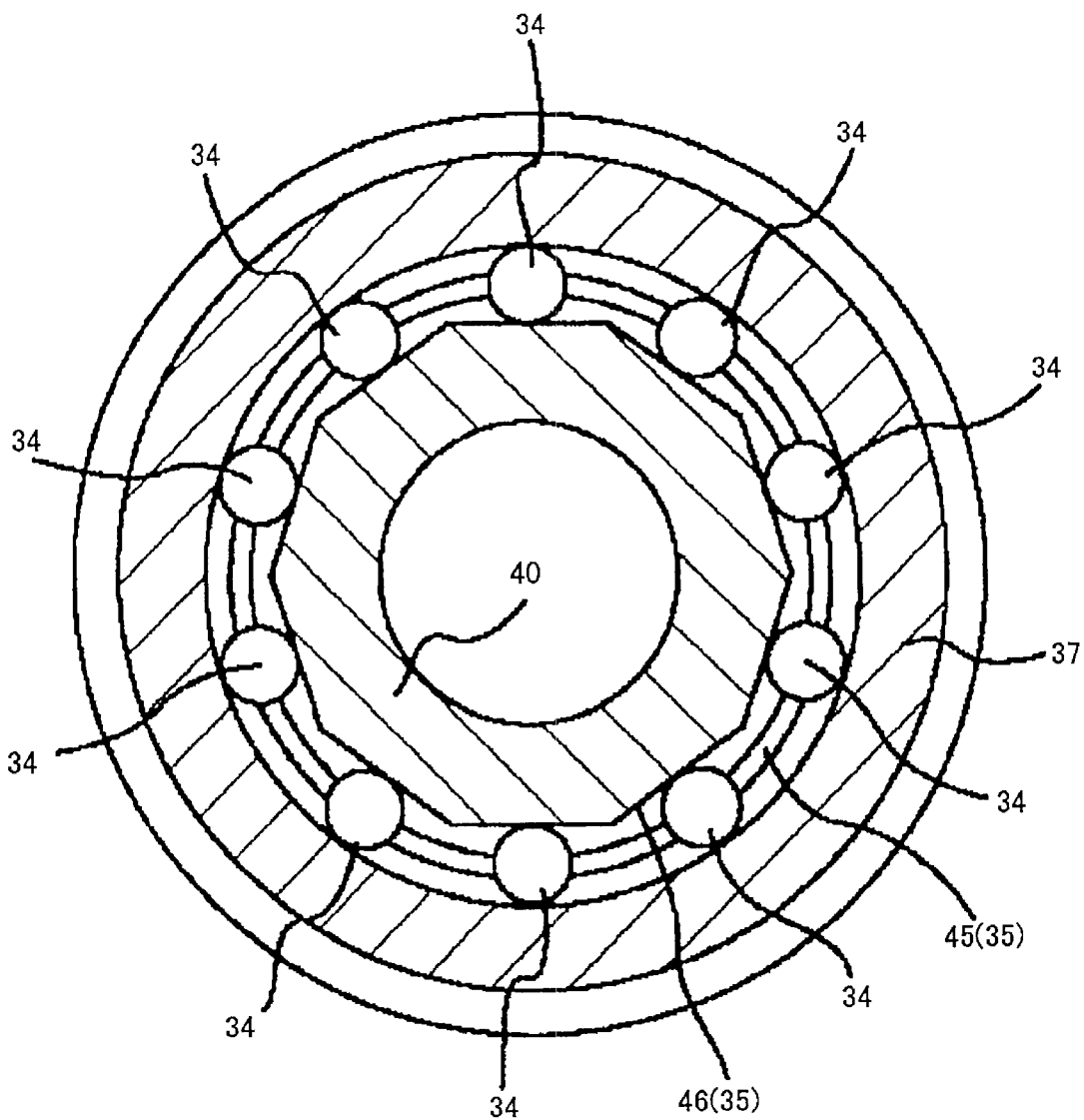
FIG. 2 is a longitudinal section showing a main portion of the two-wheel/four-wheel drive switching device of FIG. 1.
Figure 3:
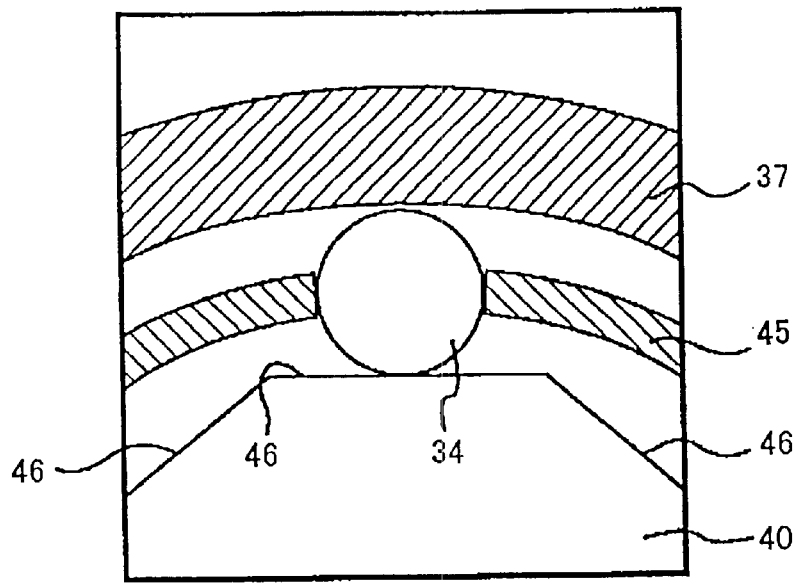
FIGS. 3A and 3B are enlarged sectional views showing the main portion illustrated in FIG. 2 for explaining the operation of a drive switching device of the invention.
Figure 3:
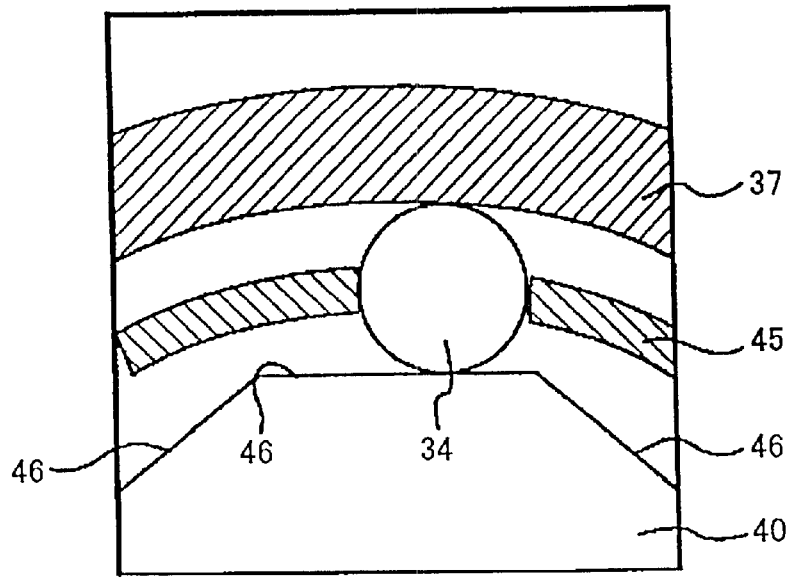

Referring to FIGS. 1 to 3, a preferred embodiment of the invention will be described below.

Figure 4:
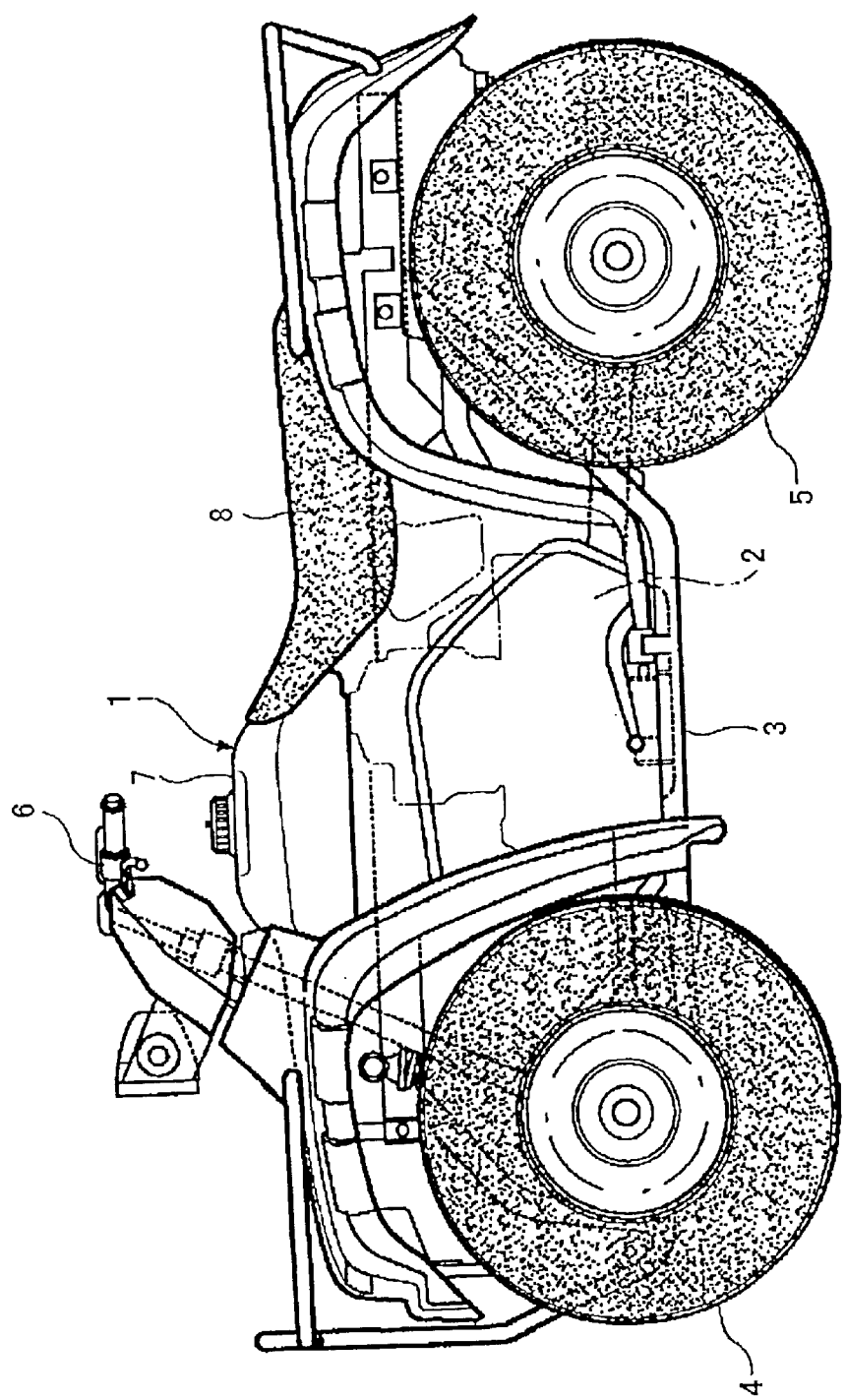
FIG. 4 is a side view showing an example of a vehicle provided with a two-wheel/four-wheel drive switching device.
Figure 5:
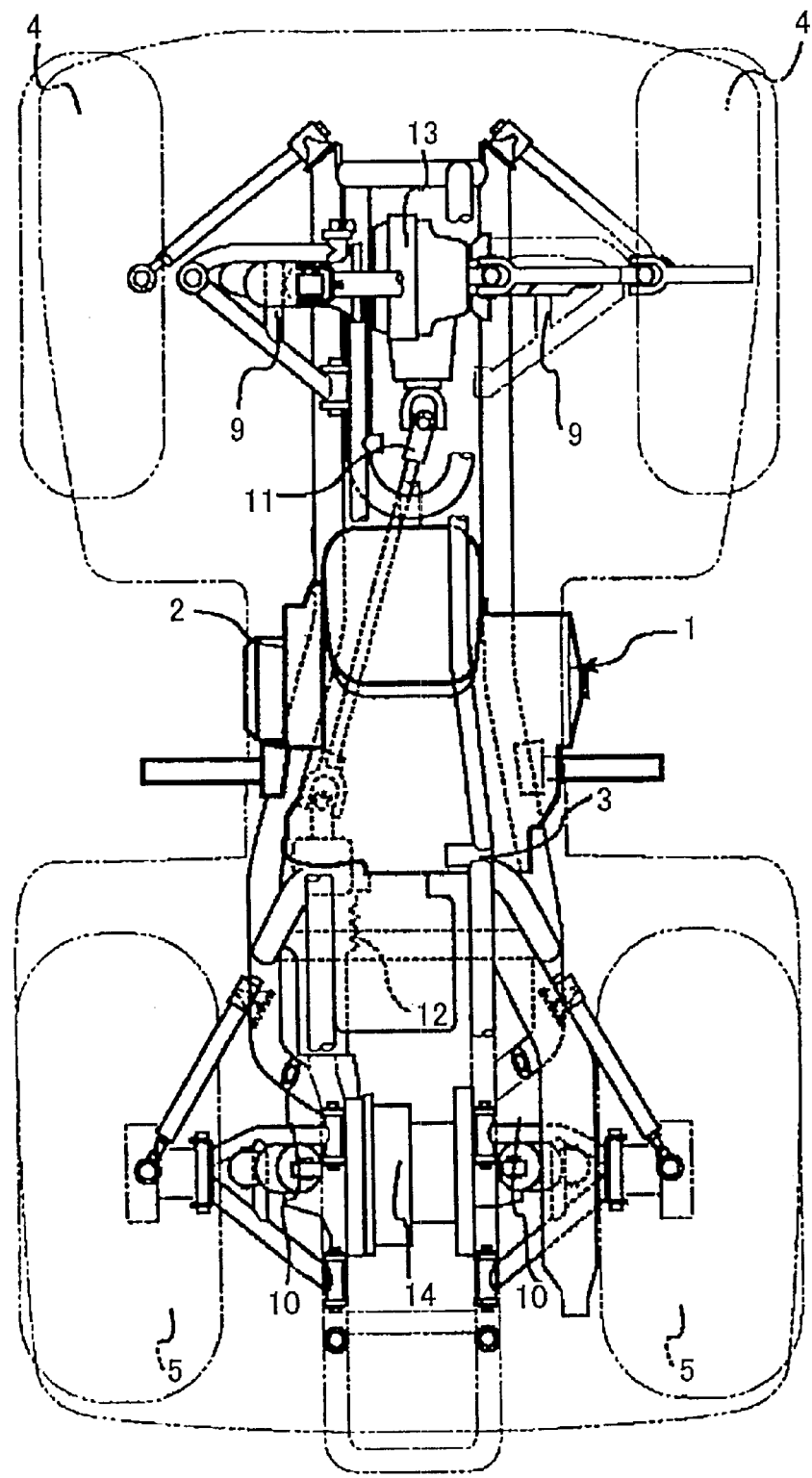
FIG. 5 is a plan for explaining the body configuration of the vehicle shown in FIG. 5.
Figure 6:
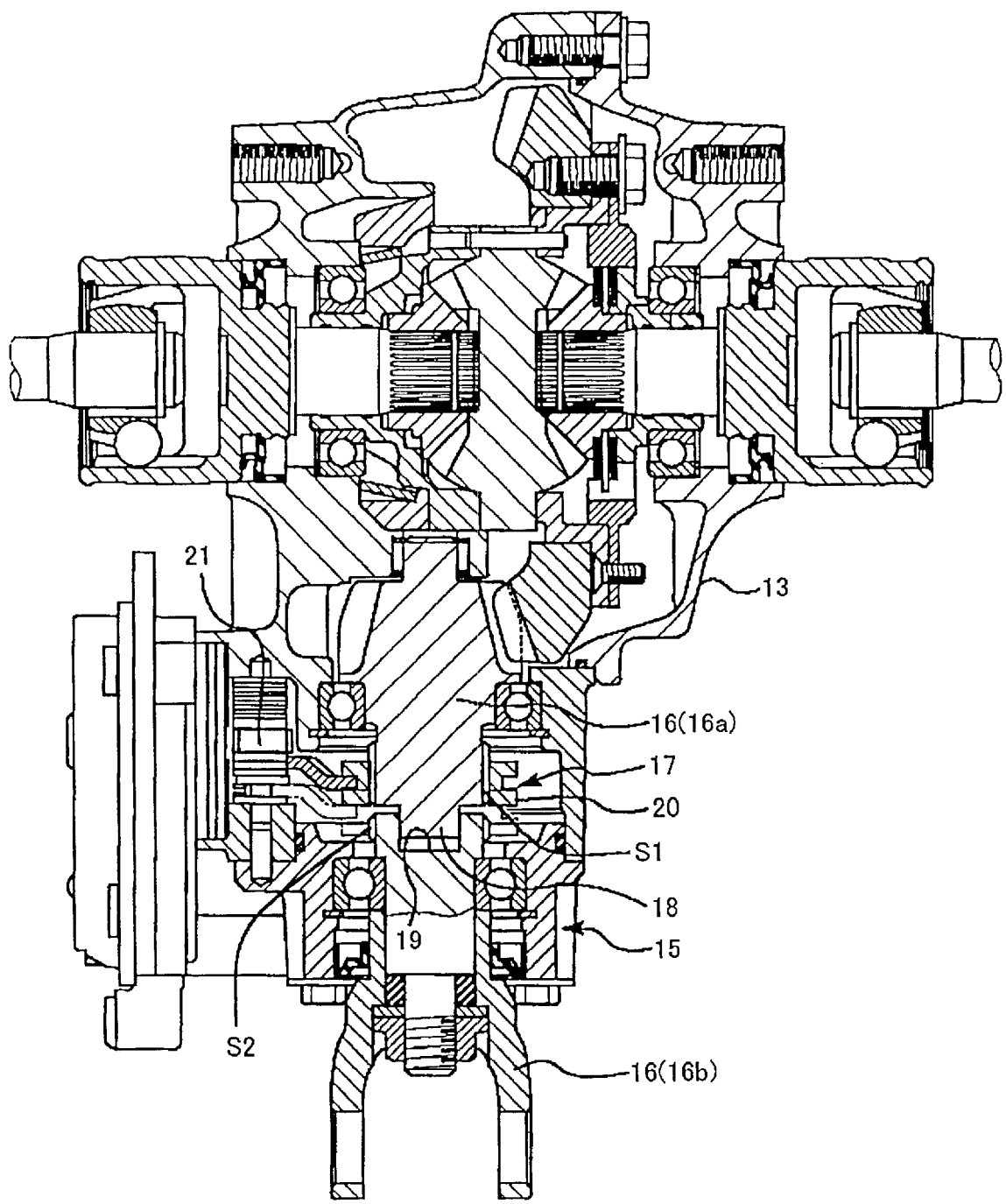
FIG. 6 is a sectional view showing a main portion of an example of a conventional type two-wheel/four-wheel drive switching device.

As primary components of the vehicle are common to those shown in FIGS. 4 and 5, in the description below the same reference numbers are applied.

A two-wheel/four-wheel drive switching device (hereinafter referred to as a drive switching device) of the preferred embodiment, indicated by reference number 30 in FIG. 1, is provided in a power transmission system arranged between the front wheels 4 and the engine 2. The drive switching device is formed by a switching device 31 for transmitting power from the power transmission system or disconnecting the transmission of power. The switching device 31 includes a driving shaft 32 connected to the drive side, a driven shaft 33 fitted to the driving shaft 32 via an inner ring 40 and an outer ring 37 having an annular clearance therebetween, plural connecting/disconnecting members 34 provided in the clearance between the inner ring 40 and the outer ring 37 for selectively connecting and disconnecting the driving shaft 32 and driven shaft 33, a switching mechanism 35 for selectively positioning the connecting/disconnecting members 34 in a position in which the driving shaft 32 and the driven shaft 33 are connected or in a position in which they are disconnected, and a casing 36 surrounding the above-mentioned components.

The cylindrical outer ring 37, extending from the side of the engine 2, is rotatably mounted on a bearing 38 within the casing 36. The outer ring 37 is axially divided into a first outer ring 37a and a second outer ring 37b. The first outer ring and the second outer ring are connected via splines 60 provided at their respective ends so that they can be integrally connected so as to rotate together.

Splines 39 are formed on the inner surface of the end on the side of the engine 2 of the second outer ring 37b, and the driving shaft 32 and the second outer ring 37b are connected by inserting the driving shaft 32 into the second outer ring 37b so that the driving shaft and the splines 39 are engaged.

The inner ring 40 is arranged inside the outer ring 37 via an annular clearance of predetermined width between the outer cammed surface of the inner ring and the inner cylindrical surface of the outer ring 37.

Splines 41 are formed on the inner surface of the inner ring 40, and the driven shaft 33 inserted in the casing 36 is connected to the inner ring 40 via the splines 41.

An intermediate part in the longitudinal direction of the driven shaft 33 is supported by a bearing 42 attached to the casing 36 in such a manner that the intermediate part can rotate.

A bevel gear 43 integrally formed with the end of the driven shaft 33 is engaged with a ring gear 44 of the final reduction gear mechanism 13 for the front wheels.

The plural connecting/disconnecting members 34 are formed by rollers arranged parallel to the axis of the outer ring 37, as shown in FIGS. 1 and 2. The switching mechanism 35 includes a retainer 45 holding the connecting/disconnecting members 34 in such a manner that they can rotate. The retainer 45 in turn is mounted on the outer ring 37 in such a manner that the retainer 45 can rotate around the axis of the shaft 33, and a cam 46 formed on the surface of the inner ring 40 can move the connecting/disconnecting members 34 around the clearance following the movement of the retainer 45.

An electromagnetic clutch 47 forming the switching mechanism 35 for fixing or disconnecting the retainer 45 and the outer ring 37 is provided inside the casing 36 located at the end of the outer ring 37. The electromagnetic clutch 47 is composed of a clutch plate 48 provided between the retainer 45 and the outer ring 37 and an electromagnetic coil 49 for pressing or disconnecting the clutch plate 48.

To effect the four-wheel drive mode (connected mode), the electromagnetic coil 49 is exciting to move the clutch plate 48 so as to cause the retainer 45 and the outer ring 37 to be fixed together so that they cannot rotate relative to one another.

The annularly shaped electromagnetic coil 49 is mounted in a housing 50 of conforming shape and forming an iron core. The housing 50 is mounted on the casing 36 so that the housing surrounds the driven shaft 33.

The outer ring 37, the inner ring 40 and the switching mechanism 35 are contained within the casing 36, and the casing 36 is bolted to the case of the final reduction gear mechanism 13 for the front wheels.

A control unit 51 for selectively activating the electromagnetic coil 49 and a power source 52 for supplying driving current to the electromagnetic coil 49 are connected to the electromagnetic coil 49.

In this embodiment, an oil seal 61 for separating the switching mechanism 35 and the inside of the casing of the final reduction gear mechanism 13 is provided around the driven shaft 33 and between the bearing 42 and the switching mechanism 35, and an oil seal 62 for shielding the inside of the switching device 31 and the space on the side of the driving shaft 32 is provided between the end of the driven shaft 33 and the inside of the end of the inner ring 40.

Being sealed by the two oil seals 61 and 62, the switching device 31 can be lubricated independently of the other actuating parts such as the final reduction gear mechanism 13.

Further, a dust seal 63 is provided between the first outer ring 37a and the inner face of the end of the casing 36 so that clearance is sealed to prevent dust and the like from entering the casing 36.

In the drive switching device 31 of this embodiment, the supply of current to the electromagnetic coil 49 is interrupted to stop the transmission of driving force to the front wheels 4 by releasing the connection of the retainer 45 and the outer ring 37 by the electromagnetic clutch 47. That is, as shown in FIG. 3A, the connecting/disconnecting members 34 are moved to the position of the bottom of the cam 46 where it is held in a position apart from the outer ring 37. As a result, the outer ring 37 and the inner ring 40 are disengaged from one another, and hence the rotational motion of the driving shaft 32 is prevented from being transmitted to the driven shaft 33 so that the driving of the front wheels 4 is stopped.

To realize four-wheel drive, the retainer 45 is fixed to the outer ring 37 by supplying current to the electromagnetic coil 49 so as to engage the electromagnetic clutch 47. Accordingly, the connecting/disconnecting members 34 held by the retainer 45 are moved together with the outer ring 37, as shown in FIG. 3B, to a position towards the top of the cam 46 formed on the inner ring 40 where they are pressed against the inner surface of the outer ring 37. As a result, the outer ring 37 and the inner ring 40 are connected via the connecting/disconnecting members 34, whereby the driving shaft 32 and the driven shaft 33 are connected, the rotational motion of the driving shaft 32 is transmitted to the driven shaft 33, and driving of the front wheels 4 is effected.

In the drive switching device of the invention, as the connecting/disconnecting members 34 are employed to selectively transmit rotational force between the outer ring 37 and the inner ring 40, the amount of sound which is generated when the four-wheel drive mode is engaged and disengaged is extremely small.

As the switching device 31 is formed as a unitary device and can be mounted to the final reduction gear mechanism 13 for the front wheels, there is no need to rearrange the existing structure.

Moreover, the driving shaft 32 and the driven shaft 33 can be connected and disconnected even if there is difference in rotational speed between the front wheels 4 and the rear wheels 5, and no complex auxiliary mechanism such as a synchronization mechanism is required, and the hence the overall configuration is simplified.

In this embodiment, the drive switching device 31 is sealed by the two oil seals 61 and 62, and thus the drive switching device 31 can be individually lubricated by a lubricant different from that used to lubricate the other actuating parts. Therefore, the drive switching device 31 can be lubricated by an optimum lubricating method (for example, lubrication by grease).

Further, as the dust seal 63 for sealing the end of the casing 36 is provided between the casing 36 forming the drive switching device 30 and the outer ring 37 inserted into the casing 36 from the end, dust and water are prevented from entering the casing 36, the soundness of the drive switching device 31 can be secured, the sealing performance of the drive switching device 31 is further enhanced, and the independence of lubrication can be secured.

The form and the dimensions of each component in the preferred embodiment and shown in the drawings are given only as examples and can be variously changed according to the requirements of design.

As described above, according to the invention, as the driving shaft and the driven shaft are connected or disconnected by the connecting/disconnecting member provided in a part in which the driving shaft and the driven shaft are fitted, they can be smoothly connected or disconnected even if there is difference in rotational speed between those members. Therefore, no complex auxiliary mechanism such as a synchronization mechanism is required, and the drive switching device according to the invention can have a simple structure.

Very little impulse or clashing sound occurring during connection and disconnection is generated, and as a result the generation of noise in switching between drive modes is inhibited.

As the switching device can be mounted by attaching it to the existing structure of the final reduction gear, it is not necessary to make large changes to the existing structures.

Also, the switching device is provided its own independent lubricating space by providing the oil seal for the driven shaft and sealing the switching device, and thereby it can be independently lubricated separately from the other actuating parts. Hence, a lubricating method most suitable for the switching device can be selected.

Further, because dust and water are prevented from entering the switching device by providing the dust seal at the opening at the end of the casing forming the switching device, the integrity of the unit is secured, the sealing performance of the switching device is further enhanced, and independence of lubrication can be secured.

It should further be apparent to those skilled in the art that various changes in form and detail of the invention as shown and described above may be made. It is intended that such changes be included within the spirit and scope of the claims appended hereto.

What is claimed is:

1. A vehicular two-wheel/four-wheel drive switching device, comprising:
    a driving shaft extending to a drive side of said switching device,
    a driven shaft extending from a driven side of said switching device,
    an inner ring and an outer ring having a generally annular clearance formed therebetween, one of said inner ring and said outer ring being coupled to said driving shaft and the other of said inner ring and said outer ring being coupled to said driven shaft,
    a plurality of connecting/disconnecting members provided in said clearance between said inner ring and said outer ring for selectively connecting and disconnecting said inner ring and said outer ring,
    a switching mechanism for selectively positioning said connecting/disconnecting members in one of a position in which said inner ring and said outer ring are connected and in a position in which said inner ring and said outer ring are disconnected,
    a casing receiving said inner ring, said outer ring, said connecting/disconnecting members, and said switching mechanism, and
    first and second oil seals provided in respective locations at a predetermined interval in a longitudinal direction of said driven shaft for sealing said casing so that said switching device can be lubricated independently of other actuating parts.

2. The vehicular two-wheel/four-wheel drive switching device according to claim 1, further comprising a dust seal for sealing an end of said casing, said dust seal being provided in a clearance formed between said casing and one of said driving shaft and said driven shaft.

3. The vehicular two-wheel/four-wheel drive switching device according to claim 1, wherein said inner ring has a plurality of cam surfaces formed thereon, and said outer ring has a cylindrical inner surface facing said cam surfaces.

4. The vehicular two-wheel/four-wheel drive switching device according to claim 3, wherein said connecting/disconnecting members each comprise a roller, said rollers extending in said clearance between said inner ring and said outer ring in an axial direction of said driving and driven shafts.

5. The vehicular two-wheel/four-wheel drive switching device according to claim 4, wherein said switching mechanism comprises a retainer for rotatably holding said rollers, and an electromagnetic clutch coupled to said retainer.

6. The vehicular two-wheel/four-wheel drive switching device according to claim 5, wherein in said position in which said inner ring and said outer ring are disconnected said position electromagnetic clutch is disengaged said rollers abut lower portions of corresponding ones of said cam surfaces, and in said position in which said inner ring and said outer ring are connected said electromagnetic clutch is engaged, said retainer moves together with said outer ring, and said rollers are moved towards higher positions of said cam surfaces so as to abut said higher portions of corresponding ones of said cam surfaces and said inner surface of said outer ring.

7. The vehicular two-wheel/four-wheel drive switching device according to claim 1, wherein said outer ring comprises first and second portions coupled to one another via a spline connection.

8. The vehicular two-wheel/four-wheel drive switching device according to claim 1, further comprising a bevel gear integrally formed with an end of said driven shaft, said bevel gear being engaged with a ring gear of a final reduction gear for said front wheels.

* * * * *